United States Patent [19]

Gudmundson et al.

[11] Patent Number: 5,295,152
[45] Date of Patent: Mar. 15, 1994

[54] TDMA FOR MOBILE ACCESS IN A CDMA SYSTEM

[75] Inventors: Bjorn Gudmundson, Sollentuna; Bengt Persson, Djursholm, both of Sweden

[73] Assignee: Telefonaktiebolaget L M Ericsson, Stockholm, Sweden

[21] Appl. No.: 866,579

[22] Filed: Apr. 10, 1992

[51] Int. Cl.[5] .............................................. H04K 1/00
[52] U.S. Cl. .................................... 375/1; 455/33.1; 379/63; 380/34
[58] Field of Search ............................. 375/1; 380/34; 455/33.1, 51, 57; 379/59, 61, 63; 370/18, 19, 20, 21, 22

[56] References Cited

U.S. PATENT DOCUMENTS

| | | | |
|---|---|---|---|
| 4,134,071 | 1/1979 | Ohnsorge | 325/42 |
| 4,293,953 | 10/1981 | Gutleber | 375/25 |
| 4,301,530 | 11/1981 | Gutleber | 370/18 |
| 4,470,138 | 9/1984 | Gutleber | 370/18 |
| 4,494,228 | 1/1985 | Gutleber | 370/21 X |
| 4,580,262 | 4/1986 | Naylor et al. | 371/5 |
| 4,613,990 | 9/1986 | Halpern | 455/33 |
| 4,644,560 | 2/1987 | Torre et al. | |
| 4,672,658 | 6/1987 | Kavehrad et al. | 379/63 |
| 4,736,461 | 4/1988 | Kawasaki et al. | 455/343 |
| 4,765,753 | 8/1988 | Schmidt | 370/18 X |
| 4,901,307 | 2/1990 | Gilhousen et al. | |
| 4,930,140 | 5/1990 | Cripps et al. | |
| 4,984,247 | 1/1991 | Kaufmann et al. | |
| 5,022,046 | 6/1991 | Morrow, Jr. | 370/18 X |
| 5,022,049 | 6/1991 | Abrahamson et al. | |
| 5,048,059 | 9/1991 | Dent | |
| 5,056,109 | 10/1991 | Gilhousen et al. | 375/1 |
| 5,091,942 | 2/1992 | Dent | |
| 5,101,501 | 3/1992 | Gilhousen et al. | |
| 5,103,459 | 4/1992 | Gilhousen et al. | |
| 5,109,390 | 4/1992 | Gilhousen et al. | |
| 5,138,631 | 8/1992 | Taylor | 370/18 X |

FOREIGN PATENT DOCUMENTS

| | | |
|---|---|---|
| 0069275 | 1/1983 | European Pat. Off. |
| 0370862 | 5/1990 | European Pat. Off. |
| 400314 | 12/1990 | European Pat. Off. |
| 0462572 | 12/1991 | European Pat. Off. |

OTHER PUBLICATIONS

*IEEE Global Telecommunications Conference & Exhibition,* Hollywood, Fla., Nov. 28–Dec. 1, 1988, vol. 1 of 3, Mahesh K. Varanasi et al, "An Iterative Detector for Asynchronous Spread-Spectrum Multiple-Access Systems", pp. 556–560.

*The Transactions of the IEICE,* vol. E71, No. 3, Mar. 1988, Tatsuro Masamura, "Spread Spectrum Multiple Access System with Intrasystem Interference Cancellation", pp. 224–231.

*IEEE/IEICE Global Telecommunications Conference,* 1987, Conference Record vol. 1 of 3, Nov. 15–18, 1987, Tokyo, Japan, Ryuji Kohno et al, "Adaptive Cancellation of Interference in Direct-Sequence Spread-Spectrum Multiple Access Systems", pp. 630–635.

MacWilliams, F., *The Theory of Error-Correcting Codes, Part I and II,* New York: North-Holland, 1988, pp. 93–124, 451–465.

"Very Low Rate Convolutional Codes for Maximum Theoretical Performance of Spread-Spectrum Multiple-Access Channels" A Viterbi, IEEE Journal on Selected Areas in Communications, vol. 8, No. 4, May 1990.

"A Class of Low-Rate Nonlinear Binary Codes", A. Kerdock, Information and Control, vol. 20, pp. 182–187 (1972).

*Primary Examiner*—Tod R. Swann
*Attorney, Agent, or Firm*—Burns, Doane, Swecker & Mathis

[57] ABSTRACT

A method and system for increasing the capacity of radiotelephone communication systems by eliminating interference to communication traffic caused by random access bursts from unconnected mobile station are disclosed. Access slots are provided in CDMA signals by interrupting other communication traffic of mobile stations using the same frequency at periodic intervals. This allows mobile access bursts to be received at a base station without interfering with other traffic.

17 Claims, 4 Drawing Sheets

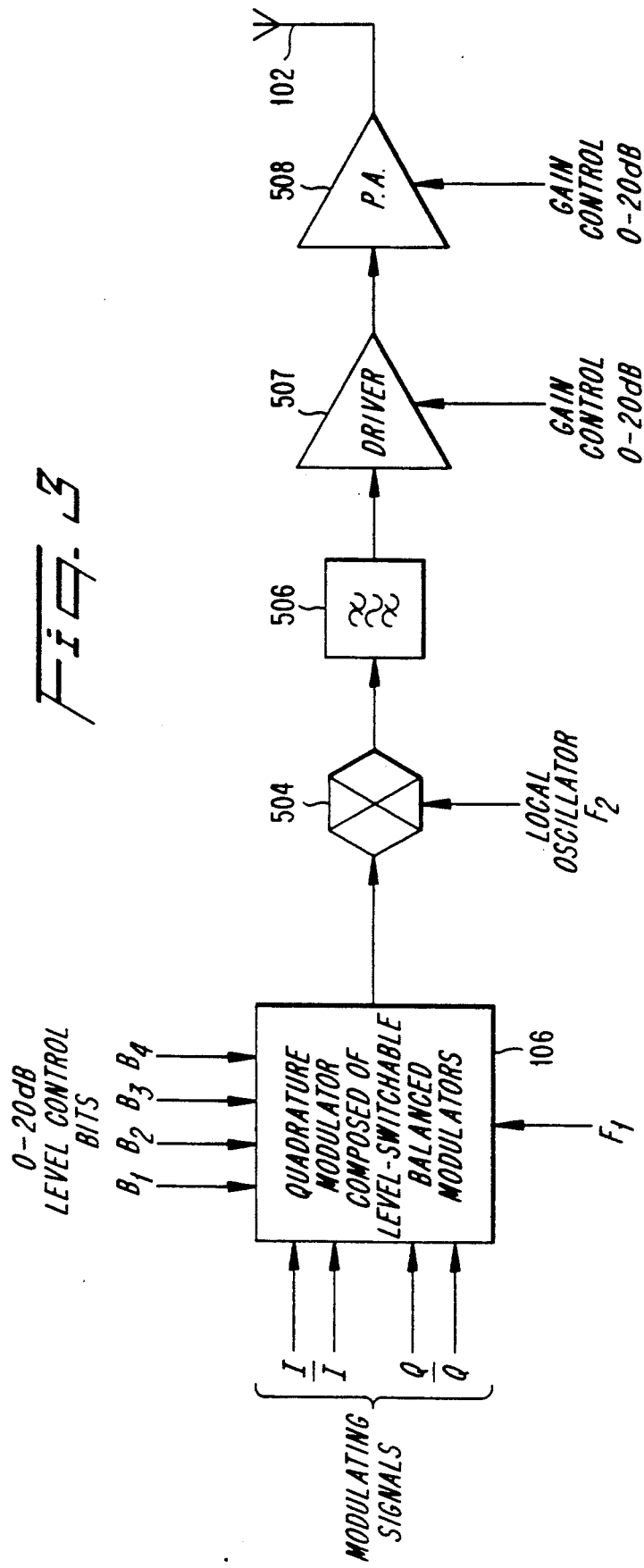

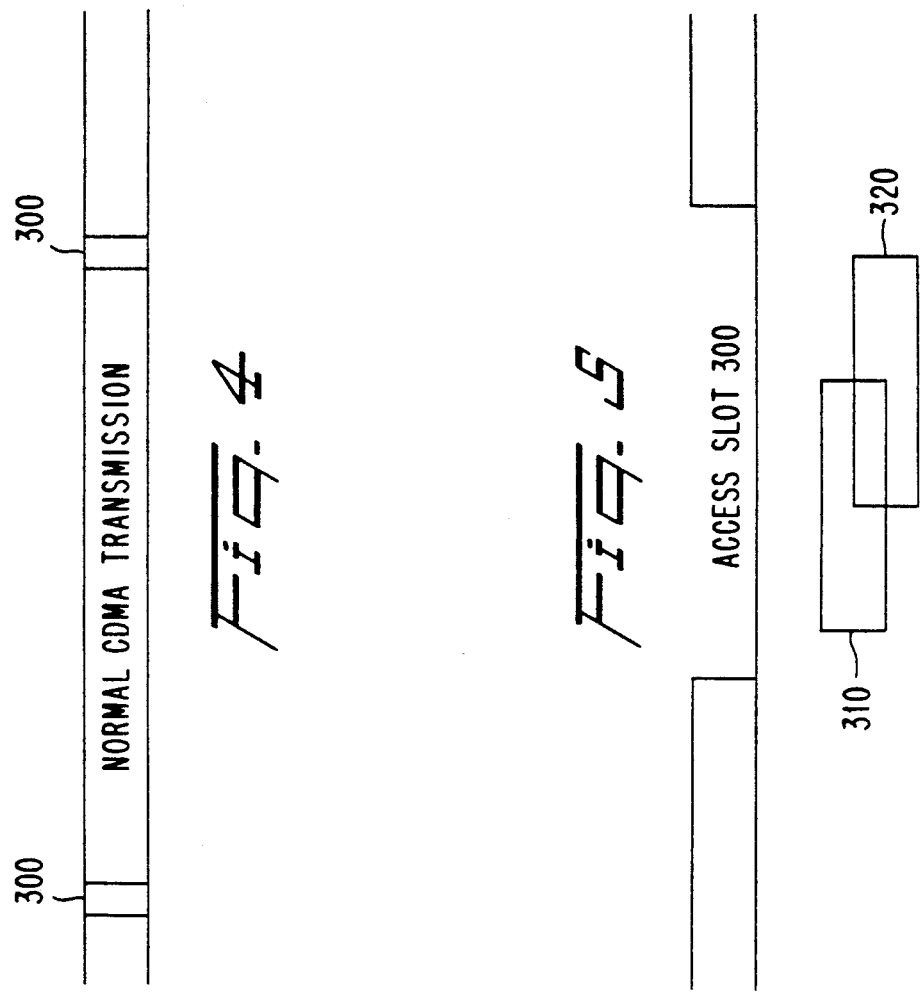

TDMA FOR MOBILE ACCESS IN A CDMA SYSTEM

BACKGROUND

The present invention relates generally to methods and systems for mobile station access to radiotelephone systems. More particularly, the present invention relates to such methods and systems which eliminate interference between mobile station access transmissions and other communication traffic at a base station in CDMA radiotelephone systems.

Radiotelecommunication technology has exploded in the past decade as a convenient and efficient alternative to conventional communication systems such as the telephone. Mobile telephones, in particular, have found widespread acceptance as personal communication devices due to their portability. The rapid growth in this industry has mandated that system designers find ways to increase the capacity of these systems to satisfy the rapidly growing demand. Increasing capacity, however, presents numerous challenges because the frequency spectrum available for radiotelephone systems is relatively limited. Thus designers must contend with the inherent tension between the desire to increase capacity and maintain high quality communications on the one hand, and the limited available spectrum and interference considerations on the other hand.

New technologies have been developed to address the dilemma posed by the desire for increased capacity and these inherent difficulties. Initially, radiotelephone systems were implemented using analog technology and frequency division multiple access (FDMA) techniques method. In FDMA systems, every call between a mobile station and a base station occupies a pair of unique frequency channels until either the call is completed or a handoff occurs.

While these systems generally operated to specifications, the pressure for increased capacity led to the recognition that digital technology using time division multiple access techniques (TDMA) would provide roughly a five to ten fold increase in capacity, a level which could not be realized using analog technology and FDMA. In TDMA systems, each transmitter is allocated a time slot on a frequency during which it can transmit bursts of data. Other transmitters can use the other time slots available on the same frequency. Currently, many of the major radiotelephone systems throughout the world are in the process of converting existing technology to digital TDMA systems to capture this additional capacity.

A third type of system has previously been proposed which is expected to provide even more capacity than TDMA systems. In code division multiple access (CDMA) systems, different spread spectrum, coded signals are transmitted by various transmitters that overlap in both time and frequency. When these signals are received, for example at mobile station, they are decoded by correlating the received signal with the unique code associated with the particular channel that the mobile station is currently using.

All of these radiotelephone systems must contend to some degree with the difficulties posed by interference and varying signal strength. Inherent in the operation of mobile telephone systems is the continual change in signal strength due to the changing distance between a mobile station and a base station and the topographical conditions between the mobile station and the base station which reflect transmissions causing multipath fading loss and propagation delay. For example, the received signal strengths of a mobile station transmitting near the base station and one transmitting near the edge of the cell may differ by several orders of magnitude.

In CDMA systems it is particularly important to regulate the power output of the mobile stations so that the received signal strengths at the base station on the same frequency are as close to equal as possible. Every mobile station using the same frequency in a CDMA system interferes with other mobile stations using that frequency. Thus, mobile stations which transmit at unnecessarily high power levels reduce system capacity since these high power signals interfere with the weaker signals transmitted from other mobile stations on the same frequency. Unfortunately, the processing gain of the circuitry used to decode these transmissions can suppress only a certain amount of interference.

One process for achieving equalized power control of mobile station transmissions in CDMA systems is called dynamic power control. Using dynamic power control techniques, a base station transmits control signals to the mobile station to adjust its transmission power based on the received signal strength from that mobile station relative to that of other mobile stations.

This technique works well for an assigned traffic channel where a closed control loop can be used. However, for the initial access attempt from the mobile station, a closed control loop does not exist. Accordingly, during the initial access attempt the mobile station can attempt to control its output power by estimating interference based on the received signal strength of signals from the base station. However, experimentation has shown that this technique is not sufficiently accurate due to measurement errors and independent fading in the reverse (uplink) channel which cannot be accurately estimated based on the signals received from the base station.

To overcome this problem of dynamic power control during the initial access attempt, it has been proposed that the mobile station start the access with low output power and repeat it with gradually increasing power until the base station acknowledges the access attempt. Theoretically, this will prevent those mobile stations close to the base station from using unnecessarily high power signals to initiate communication with the base station and interfere with other mobiles using the same frequency. This method, however, may not work well in a fast fading environment. For example, a rapidly moving mobile station may attempt to initiate a call in a first location where multipath propagation loss is very high. Accordingly, the first attempt at a very low power level might be too weak. When the mobile station increases the power level and attempts access again, the new location of the mobile station may have very favorable loss characteristics and the received signal strength at the base station might then be stronger than necessary for detection so that it interferes with other channels unnecessarily.

Another technique for solving the difficulties presented by unequal received signal strengths is subtractive CDMA demodulation. According to this technique, overlapping, coded signals are decoded in order of strongest to weakest signal strength. After each signal is decoded, it is removed or subtracted from the received, composite signal before decoding the next strongest signal. Using such a system, signal strength differences between mobile stations become less important and capacity is increased. By removing higher strength signals first, their ability to interfere with lower power signals is reduced.

Subtractive CDMA systems, however, are also susceptible to the interference problem which exists when mobile stations initiate random access. Moreover, to achieve subtractive demodulation the signals received from the mobile station must be properly time aligned by adjusting the signal transmission to account for propagation delay between the base and mobile station. As with the dynamic power control technique, timing alignment is readily achieved when a closed control loop exists after a channel has been allocated to the mobile station. For the initial random access, however, the mobile station lacks the reference information necessary to establish correct time alignment for the access transmission.

These problems reduce the efficiency and capacity of radiotelephone systems. As described above, continuously increasing demand pressures system designers to expand the capacity of such systems. Accordingly, it is highly desirable to overcome the drawbacks of systems wherein the initial access attempt by mobile stations creates interference and timing alignment problems.

SUMMARY

These and other problems can be overcome by using methods and systems according to the present invention. In a preferred embodiment of the present invention, a radio communication method and system eliminates interference caused by access initiation to channels already in use by providing a plurality of special access slots during which normal traffic and signalling channels are interrupted.

According to other preferred embodiments of the present invention, the timing alignment difficulty is solved by providing access slots which are long enough to receive mobile station access signals having, for example, either very high or very low propagation delay.

BRIEF DESCRIPTION OF THE DRAWINGS

These and other objects and advantages of the present invention will become more apparent from the following detailed description of preferred embodiments when read in conjunction with the attached Figures in which:

FIG. 3 illustrates a more detailed block diagram of the quadrature modulator and power amplifier of FIG. 1;

FIG. 4 illustrates a CDMA transmission format according to another exemplary embodiment of the present invention; and FIG. 5 shows the access slots in the transmission format of FIG. 4 in more detail.

DETAILED DESCRIPTION

To facilitate understanding of the present invention, an exemplary embodiment in the context of a CDMA subtractive demodulation system will now be described. Such a system is disclosed in U.S. patent applications Ser. No. 07/628,359 filed on Dec. 17, 1990, and Ser. No. 07/739,446 filed on Aug. 2, 1991, both entitled "CDMA Subtractive Demodulation", which are hereby incorporated by reference. However, those skilled in the art will recognize that the present invention is not limited to CDMA subtractive demodulation systems and can also be applied to conventional CDMA systems or any other radio communication systems in which it is desirable to eliminate interference caused by random access call attempts between radio communication devices.

In CDMA subtractive demodulation systems, information between plural mobile radio stations and a base station is transmitted in blocks of codewords, e.g., forty-two codewords per block. A convenient signal transmission format comprises sequences of 128-bit codewords transmitted serially over a radio communications channel. A radio receiver amplifies, filters, samples, and converts the received composite signal, which consists of overlapping communication signals from different transmitters, into digital form for processing.

The digitized composite signal is descrambled with a unique scrambling code corresponding to the information having the greatest received signal strength. The descrambled signal is then correlated with "spreading" codes known as orthogonal (or bi-orthogonal) block codes that are associated with the information signals. The 128-bit signal samples are decoded by an orthogonal block decoder by determining which block code has the best correlation to the sample signal, decoding that block code and producing a signal identifying which of the block codes was decoded. This signal is used to subtract the portion of the composite signal relating to the decoded block prior to attempting to decode the next strongest, coded information signal.

Figure 1:
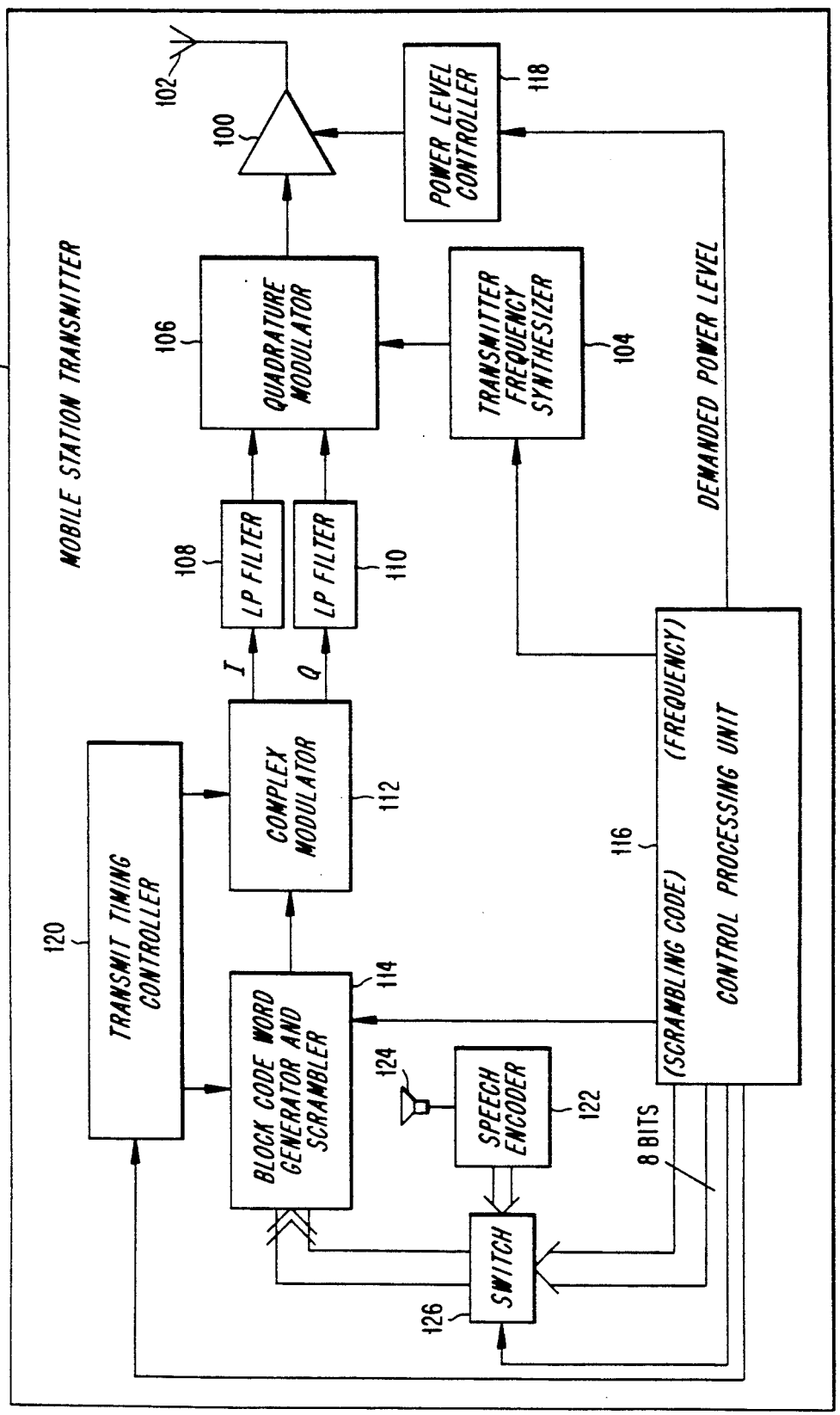
FIG. 1 illustrates a mobile station transmitter according to an exemplary embodiment of the present invention.
Figure 2:
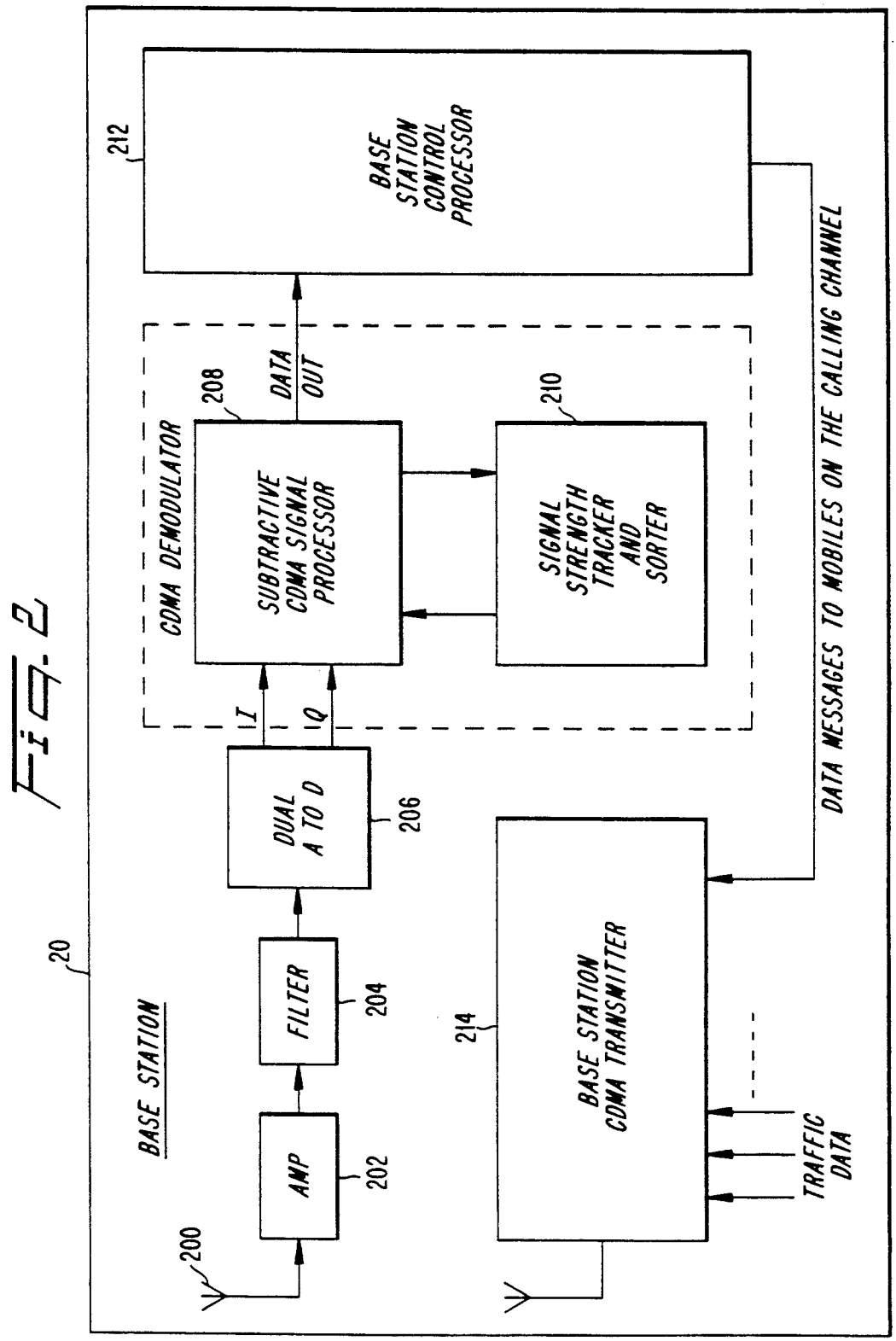
FIG. 2 shows a block diagram of a base station according to an exemplary embodiment of the present invention.

In an exemplary embodiment of the present invention illustrated in FIGS. 1 and 2, a mobile station transmitter 10 includes a radio frequency (RF) power amplifier 100 coupled to a duplex antenna 102. A frequency synthesizer 104 generates the transmission carrier waveform that is modulated with an information signal, e.g., speech, by a quadrature modulator 106. The quadrature modulator 106 can implement a modulation technique such as impulse-excited Quadrature Amplitude Modulation (QAM) in which information bits are modulated alternately on the in-phase (I) channel and the quadrature (Q) channel using the waveforms generated by two low-pass filters 108, 110. A complex modulator 112 calculates impulse response waveforms that correspond to the polarities of received digital information signals and converts those waveforms into analog form. The low-pass filters 108, 110 principally remove the digital-to-analog conversion sampling frequency components. Alternately, the information signal may be mixed initially to a convenient intermediate frequency and then converted to the higher carrier transmission frequency by heterodyne mixing the modulated intermediate frequency waveform with an offset frequency.

The digital information signals received by the complex modulator 112 are produced by a block codeword generator and scrambler 114. When the mobile station 10 is transmitting a random access message, i.e., before speech communication begins, the message is generated in the control processing unit 166 and input to the block codeword generator and scrambler 114, for example, eight bits at a time. However, when speech transmission commences, the eight-bit input to the block codeword generator and scrambler 122 come from a speech digitizer and encoder 122. The speech encoder 122 receives a microphone signal from a microphone 124 and outputs eight-bit words. A switch 126 is controlled by the control processing unit 116. For input to the block codeword generator and scrambler 114, the control processing unit 116 selects either itself for transmission of random access messages or the speech encoder 122 for transmitting conversation. Even after the random access procedure is completed, the control processing unit 116 can operate the switch 126 from time to time to select message transmission and interrupt speech transmission. This is done, for example, for high priority signalling message exchange between the base station 20 and the mobile station 10, such as Fast Associated Control Channel (FACCH) messages.

In the block codeword generator and scrambler 114, eight bits of information can be spread using a suitable orthogonal (or bi-orthogonal) block code to, for example, a 128-bit codeword. The 128-bit codeword can then be scrambled by modulo-2 adding a unique scrambling code to the codeword. Various aspects of scrambling codes and their generation and application in this context are described in co-pending U.S. patent application Ser. No. 07/866,865, filed on Apr. 10, 1992, by Paul W. Dent and Gregory E. Bottomley for "Multiple Access Coding for Mobile Radio Communications," which is hereby incorporated by reference. The information bits and the scrambling code originate from the control processing unit 116 that also selects the carrier frequency to be generated by the frequency synthesizer 104 and transmits a power level command to a power level controller 118. As discussed above, the power level controller 118 is used to adjust the output power of the mobile station once a closed control loop has been established to maintain a mean received signal strength at the base station 20.

The power level controller 118 advantageously comprises a combination of attenuators and components for controlling the bias of the power amplifier 100 to achieve the commanded power level when transmitting each codeword. A combination of attenuators and amplifier bias control is useful in achieving a suitably wide transmission power level control range, e.g., 60 dB, and it will be appreciated that a wide variety of combinations are known and the following techniques can be used as desired in the present invention.

Because the power amplifier's final stage might be controllable within only a 20-dB power range, a wide transmission power control range is difficult to achieve by controlling the bias of only one stage of the power amplifier. Accordingly, for a two-stage power amplifier 100, controlling both stages would yield a 40-dB control range and providing a fixed 20-dB attenuator selectively switched into the output of the power amplifier can achieve the desired 60-Db range. Of course, if bias control of a single amplifier stage is preferred, two independently controllable 20-dB fixed attenuators may be selectively switched into the output, thereby achieving the same 60-dB control range. An example of a multistage power amplifier is shown in FIG. 3.

FIG. 3 shows a functional schematic of a multistage power amplifier in which modulating in-phase (I) and quadrature (Q) signals are input to a quadrature modulator 106. The quadrature modulator 106 includes level-switchable balanced modulators controlled by level control bits $B_1$-$B_4$ to provide a first 0–20 dB control. A first frequency $F_1$ providing the carrier frequency is also input to the quadrature modulator 106 from the transmitter frequency synthesizer 104. The output of the quadrature modulator 106 is input to an upconverter 504, which is provided with a second frequency $F_2$ from the transmitter frequency synthesizer 104. The upconverter 504 heterodyne mixes the modulated signal (which is at a lower frequency for technical convenience) with the higher, fixed second frequency $F_2$ to translate it to a higher output frequency. Conversely, a downconverter, or super heterodyne mixer, is generally employed in a receiver to convert a high frequency signal received on the antenna to a lower, fixed intermediate frequency at which amplification is more conveniently achieved. In either case, it is advantageous to modulate or demodulate a signal at a lower, fixed frequency and to change the oscillator that drives the mixer to vary the frequency at the antenna.

The output of the converter 504 is input to a bandpass filter 506 and fed to a driver 507. The gain on the driver 507 is controlled between 0–20 dB by power level controller 118. The output of the driver 507 is input to a power amplifier 508, the gain of which is controlled between 0–20 dB by gain control of the power level controller 118. The output of the final amplifier 508 is input to the antenna 102 for broadcast. This circuit permits a total transmission power control range of 0–60 dB. It will be appreciated that variable attenuators may also be used. Switchable and variable attenuators are commercially available from number of sources, such as Avantek, Inc., Santa Clara, Calif.

FIG. 2 shows an exemplary base station receiver/transmitter 20 for detecting mobile random accesses in a communications environment of overlapping, ongoing radio traffic signals. An antenna 200 receives a composite signal which is amplified by a low-noise, RF amplifier 202. The amplified signal is spectrally shaped by a filter 204, and a dual analog-to-digital converter 206 converts the filtered analog signal into a stream of complex digitized signals having real or in-phase parts (I) and imaginary or quadrature parts (Q). Alternatively, an intermediate frequency mixing stage may precede the amplifier 202 so that amplification and filtering occur at a lower intermediate frequency.

After the frequency demodulation process, the complex, digitized composite signal is processed by a CDMA subtractive signal processor 208. Because the individual signals to be demodulated are each scrambled with a unique scrambling code generated by the mobile station's control processing unit 116, the CDMA signal processor 208 sequentially descrambles the composite signal with each scrambling code in order of greatest to weakest signal strength. The descrambled signal is decoded by correlation with all of the bi-orthogonal codes possibly used for encoding to extract eight bits of information for each 128-bit bi-orthogonal code word. The decoded information bits are transmitted to a base station control processor 212 for further speech/data processing.

By selecting the scrambling codes corresponding to the signals having the greatest signal strength, the base station CDMA processor 208 demodulates the various overlapping signals in order of predicted signal strength from strongest to weakest. A signal strength tracker and sorter 210 predicts the signal strengths from past observations and orders them. Recognizing that power levels change over time, the signal strength tracker and sorter 210 freely reorders the signal decoding sequence to accommodate relative power level changes. Expected signal strength levels may be predicted based on a history of past power levels by extrapolating a next power level using an estimated change of power level.

Having thus briefly described an exemplary subtractive CDMA system in which speech communication, for example, can be carried out after communication has been established between a mobile station and a base station, a method and system for providing random access call initiation according to an exemplary embodiment of the present invention will now be described. As shown in FIG. 4, access slots 300 are provided in the uplink (mobile-to-base station) transmissions at regular intervals. Every mobile station using a channel on the same frequency will interrupt regular CDMA transmissions, including voice communication and other control signalling, at the same time to provide these access slots. In systems where transmissions in neighboring cells are synchronized with each other, including the exemplary subtractive CDMA system discussed above, mobile stations transmitting on the same frequency in different cells will also provide access slots at the same time.

Thus, according to this exemplary embodiment, idle mobile stations 10 will transmit random access bursts only during such access slots. This allows a mobile station to transmit at a power level high enough to be detected by the base station without concern for interference with other communication traffic on the same frequency. The power level of the access burst can, for example, be a predetermined maximum power which has been broadcast by the base station on the control channel. Alternately, the mobile station can measure the received power from the base station and use this value to calculate a suitable power level for the access burst. This could be done, for example, by subtracting the received power of the base station signal from some predetermined power which has previously been broadcast by the base station.

Of course, interference is still possible between access bursts transmitted by different mobile stations during the same access slot. However, such interfering access attempts can be solved by repetition according to known access algorithms. One such algorithm is known as the ALOHA algorithm. According to the ALOHA algorithm, a mobile station that desires to make an access attempt selects an access slot and transmits an access message. When the base station receives that message it sends an acknowledge message to the mobile station. If the mobile station does not receive an acknowledge message, either due to a collision caused by two mobiles selecting the same access slot or simply due to transmission errors, the mobile selects a new access slot after a random time period and repeats the access message. This process can continue until an acknowledge is received or until the access has failed a certain maximum number of times.

In the exemplary mobile station of FIG. 1 the control processing unit 116 of each mobile station 10 initiates each of the access slot periods at predetermined, equally spaced intervals by operating the switch 126 so that data from the control processing unit is selected to be output from the switch 126. At this time, if needed, an idle mobile station 10 can initiate a random access burst. Otherwise, no data is transmitted during the access slot and any data input via microphone 124 is stored in a buffer (not shown) within the speech encoder 122. At the end of the access slot, the control processing unit can operate the switch so that the speech encoder 122 can transmit data.

Since these access bursts are separated in time from other CDMA communication traffic, the bursts can be coded using either CDMA methods or any other suitable coding method. The access bursts could contain full identification information and service requests. Since, however, the time allocated to the access slots reduces overall capacity, it is important to minimize the duty cycle of the access slots. Therefore it is preferable to send very short channel requests during the access slots, followed by identification and service requests on a dedicated channel after communication between the mobile station and the base station has been established.

At the time of a random access attempt by the mobile station, the two-way propagation delay between the mobile and the base station will not be known precisely. Accordingly, as seen in FIG. 5, the duration of each access slot 300 is established based on a minimum delay (i.e., no delay due to propagation) and maximum two-way propagation delay. In FIG. 5, access burst 310 represents a transmission received at the base station with a minimum delay and burst 320 represents a similar transmission received with a maximum two-way propagation delay. A minimum delay occurs when the mobile station is close to the base station and equals the amount of time necessary for the mobile station transmitter to power up, while the maximum delay occurs when the mobile station is near the cell border. The length of the access slot is established by adding the minimum delay, the maximum two-way propagation delay, the length of the access burst, and some guard time for power ramping down at the mobile station.

Timing alignment can also be achieved using systems and methods according to the present invention. As mentioned above, such alignment is needed when using subtractive CDMA demodulation. Time alignment information is provided by the base station transmitter 214 to a transmit timing controller 120 from the control processing unit 116. In response to detecting a random access message, the base station transmitter 214 transmits reply information to the mobile processing unit 116, such as the timing difference between the time at which the mobile access transmission was received by the base station 20 and a preset, target timing value. Other information includes difference between the signal strength of the detected random access message and a predetermined signal strength which can be used to adjust the power level of subsequent transmissions of the mobile station by power level controller 118. The time alignment information from the base station 20 could either be an absolute timing advance for the mobile station 10 to use (in which case the access burst must include information indicating what timing advance the mobile station was already using) or the amount of adjustment the base station wants the mobile station to apply.

While particular embodiments of the present invention have been described and illustrated, it should be understood that the invention is not limited thereto since modifications may be made by persons skilled in the art. For example, although the exemplary embodiments discussed above refer to the remote unit as a mobile station, those skilled in the art will appreciate that the present invention can be applied to any type of remote unit (e.g., portable units). The present application contemplates any and all modifications that fall within the underlying invention disclosed and claimed herein.

What is claimed is:

1. A CDMA radio communication system comprising:
   a base station for transmitting CDMA signals within a cell;
   remote transmitting means for transmitting on uplink CDMA channels to said base station having means for interrupting data communication at a beginning of said access slots and means for selectively transmitting access bursts during said access state, wherein said uplink CDMA channels comprise access slots during which random access bursts can be transmitted to initiate communication with said base station.

2. The system of claim 1 further comprising:
   timing advance means for controlling the time at which said remote transmitting means transmits to the base station such that the base station receives all transmissions in time synchronization.

3. The system of claim 1 wherein said access slots are provided at equally spaced time intervals.

4. The system of claim 1, wherein said access bursts are transmitted in CDMA format.

5. The system of claim 1 further comprising:
   means for adjusting the output power of signals transmitted by said remote transmitting means.

6. The system of claim 5, wherein said adjusting means adjusts the output power of said remote transmitting means to a predetermined power level for transmission of access bursts.

7. The system of claim 6, wherein the predetermined power level is broadcast to said remote transmitting means by said base station.

8. The system of claim 6, wherein said remote transmitting means further comprises:
   means for measuring a received signal strength of signals transmitted by said base station, wherein the predetermined power level is calculated based on the received signal strength.

9. The system of claim 1, wherein access bursts are transmitted in a non-CDMA format.

10. A CDMA radio communication system comprising:
    a base station for transmitting CDMA signals within a cell;
    remote transmitting means for transmitting on uplink CDMA channels to said base station, wherein said uplink CDMA channels comprise access slots during which random access bursts can be transmitted to initiate communication with said base station; and
    wherein said access slots have a length based on a minimum power ramp up delay and a maximum propagation delay between the remote transmitting means and the base station.

11. The system of claim 10, wherein said access slots have a length equal to the sum of the minimum power ramp up delay, the maximum propagation delay, a length of the access burst, and a guard time.

12. A method for initiating communication between an idle remote station and a base station in a CDMA radio communication system, comprising the steps of:
    providing access slots at predetermined time intervals on a frequency during which regular CDMA communication traffic on the frequency is interrupted; and
    transmitting an access burst from the idle remote station to be received by the base station during one of the access slots.

13. The method of claim 12, further comprising the step of:
    encoding said access burst in a non-CDMA format.

14. The method of claim 12, wherein said step of providing access slots further comprises the steps of:
    interrupting voice or data signal transmission from any remote stations already connected to said bases station during the access slots; and
    storing voice or data information generated at said already connected remote stations in a buffer until said access slot has ended.

15. The method of claim 12, further comprising the steps of:
    receiving, at said remote station, an output power level for transmitting access bursts from said base station; and
    transmitting said access bursts at said output power level.

16. The method of claim 12, further comprising the steps of:
    measuring a received power level of said base station;
    calculating an output power level for said access bursts based on said received power level; and
    transmitting said access bursts at said output power level.

17. The method of claim 12, further comprising the step of:
    encoding said access burst in CDMA format.

* * * * *